United States Patent Office 2,717,908
Patented Sept. 13, 1955

2,717,908

PREPARATION OF N-CARBAMYLAMIC ACIDS

Robert H. Snyder, Newark, N. J., assignor to United States Rubber Company, New York, N. Y., a corporation of New Jersey No Drawing. Application June 10, 1954,
Serial No. 436,252

7 Claims. (Cl. 260—534)

This invention relates to an improved method of making N-carbamylamic acids which have two carbon atoms between the carboxyl group and the N-carbamyl-carbamido group. These N-carbamylamic acids are made from the appropriate urea and the anhydride of an acyclic alpha, beta-dicarboxylic acid. The N-carbamylamic acids have the formula

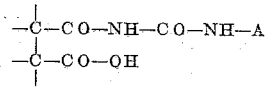

where A is hydrogen or a hydrocarbon radical, and the remaining bonds are connected only to hydrogen or to monovalent acrylic hydrocarbon groups or to an adjacent non-carbonylic carbon; in the most important aspect of the invention said remaining bonds are so arranged that the compound contains one olefinic group, >C=C<, which is in a position alpha to at least one of the carbonyl groups.

This application is a continuation-in-part of my applications, Serial No. 312,869, filed October 2, 1952, now abandoned, and Serial No. 367,108, filed July 9, 1953.

An object of the invention is to provide a method whereby the said class of N-carbamylamic acids can be made in better yield and purity than has heretofore been possible.

The only hitherto known method of making these acids, typified by N-carbamylmaleamic acid (also called maleuric acid), consists in fusing the appropriate anhydride, in this case maleic anhydride, with the appropriate urea, in this case carbamide, at 80° C.–105° C. This process has many disadvantages; namely, that the yield at best is only about 20–40% of theory because of the great number of by-products formed in this temperature range; the by-products, which cause trouble during formation of certain derivatives of the desired acid, are very hard to separate from the desired product; and the reaction is so exothermic that it can be run only on a very small scale without becoming violent. It might be thought that the reaction could be controlled better if a temperature below 80° C. were used. However, since both the reagents and the desired product are solid compounds it is impossible in a practical sense to operate at a lower temperature because the product begins to crystallize from the melt of the two reagents, thus mechanically trapping unreacted material and reducing the purity and yield of the product.

I have now found that I can prepare these N-carbamylamic acids in high purity and in substantially quantitative yield by carrying out the reaction in a medium which is a mutual solvent for the anhydride and the urea, at a temperature low enough to reduce the amount of unwanted by-products virtually to zero while still high enough to keep all of the reacting compounds in solution in a reasonable amount of the solvent. The solvent medium used in my new process is a saturated aliphatic acid having not more than four carbon atoms, viz., either formic, acetic, propionic, butyric or isobutyric acid. For economic reasons I prefer to use acetic acid. While hereinafter my process will be exemplified with acetic acid it is understood that the other acids of this homologous series also can be used.

The N-carbamylamic acids made by my invention fall into two distinct groups depending on the presence or absence of an olefinic group >C=C< in a position alpha to at least one of the carbonyl groups of the reagent anhydride. Such olefinic group imparts extremely valuable properties to new derivatives of the N-carbamylamic acids. In my above-mentioned application, Serial No. 367,108, filed July 9, 1953, I show that N-carbamylamic acids can be converted to the corresponding N-carbamylimides

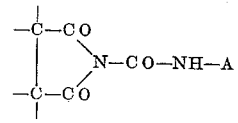

by reaction with an acyclic anhydride, such as acetic anhydride, at a temperature ranging between about 90° C. and about 140° C. R. H. Snyder and P. O. Tawney have found, as disclosed in a copending application, Serial No. 395,281, filed November 30, 1953, that those N-carbamylimides which contain such an olefinic group react with non-tertiary alcohols to form N-carbamylamic esters which retain the olefinic group. These esters, in general, cannot be made by direct reaction between an N-carbamylamic acid and an alcohol. These esters can be copolymerized, through the olefinic group, with monomers such as styrene which contain at least one terminal vinyl group $CH_2=C<$ to form valuable new resins. These copolymers are described in detail in a copending application by P. O. Tawney, Serial No. 395,282, filed November 30, 1953. Obviously, the N-carbamylamic esters derived from those N-carbamylamic acids which lack an olefinic group cannot copolymerize in this way. Therefore, the most valuable N-carbamlyamic acids made by my present invention are those containing an olefinic group >C=C< which is alpha to at least one of the carbonyl groups of the reagent anhydride.

Typical cyclic anhydrides having an alpha-olefinic group are maleic anhydride, citraconic anhydride, itaconic anhydride, ethylmaleic anhydride, ethylidenesuccinic anhydride, beta-methylitaconic anhydride, and dimethylmaleic anhydride. Typical cyclic anhydrides which lack the alpha-olefinic group are succinic anhydride, methylsuccinic anhydride, ethylsuccinic anhydride, alpha, alphadimethylsuccinic anhydride, alpha, beta-dimethylsuccinic anhydride, propylsuccinic anhydride and isopropylsuccinic anhydride.

The urea can be urea itself ($NH_2-CO-NH_2$) or a urea which has a hydrocarbon radical instead of one of the hydrogen atoms. This radical can be any radical containing only carbon and hydrogen, such as an alkyl, alkenyl, cycloalkyl, terpenyl, aralkyl, or aryl group. Typical alkyl ureas are N-methylurea, N-ethylurea, N-propylurea, N-isopropylurea, N-n-butylurea, N-sec.-butylurea, N-isobutylurea, N-tert.-butylurea, the N-amylureas, N-n-hexylurea, N-n-heptylurea, N-n-octylurea, N-n-nonylurea, N-n-dodecylurea, and N-n-octadecylurea. Typical alkenyl ureas are N-allylurea, N-methallylurea and N-crotylurea. A typical cycloalkyl urea is N-cyclohexylurea. A typical terpenyl urea is N-bornylurea. Typical aralkyl ureas are N-benzylurea and N-phenethylurea. Typical aryl ureas are N-phenylurea, the three N-tolylureas and the two N-naphthaylureas.

Hereinafter, in the general discussion of my invention the reacting anhydride and urea will be typified by maleic anhydride and urea itself (carbamide), respectively.

The temperature at which I carry out my process ranges between room temperature (20–25° C.) and about 80° C.

Below room temperature the reaction is too slow and the amount of solvent required to dissolve the urea is excessive. Above 80° C. the formation of by-products seriously reduces the yield of the desired acid, and makes its purification difficult. My preferred temperature range is between about 45° C. and about 60° C. Within this range the sodlubility of the urea and the maleic anhydride in the fatty acid is satisfactory, and the reaction takes place at a reasonable speed, with substantial absence of by-products. The product crystallizes out of the solvent at the reaction temperature in such high purity that it is usually not necessary to purify it further.

Most unexpectedly I have found that the reaction is markedly accelerated and the yield greatly improved by carrying it out the mother liquor from a previous preparation of the same compound. For example, when I react maleic anhydride with urea in fresh acetic acid I typically obtain a yield of about 55% of theory in about 12–20 hours at 50° C. (The yield can be improved by increasing the reaction time beyond 20 hours.) If I separate the crystallized N-carbamylmaleamic acid at the end of 12–20 hours and add more of the reagents to the mother liquor, the second reaction is apparently completed within five hours at the same temperature, and the yield of the product is raised to 77%. If I repeat the cycle with this twice-used mother liquor the reaction is completed within about five hours at 50° C., and the yield is about 83% of theory. When the mother liquor is used for a fourth time under these conditions the yield is substantially quantitative.

Therefore in the preferred form of my invention I react an anhydride with a urea in the mother liquor from a previous preparation of the same N-carbamylamic acid.

That this improvement of the reaction rate and yield is not due entirely to saturation of the solution with the N-carbamylamic acid being formed, e. g., N-carbamylmaleamic acid, or to catalysis by this acid, is shown by the fact that maleic anhydride urea do not react sufficiently faster in fresh acetic acid which has been saturated with pure N-carbamylmaleamic acid than they do in fresh acetic acid alone to account fully for the improvement in rate and yield. It seems likely that the improvement is also due in part to catalysis by impurities in the maleic anhydride, urea and/or solvent, and/or to by-products formed in small amount in the reaction. However, I do not limit my invention by this hypothesis.

The urea and maleic anydride react in equimolar amount to form N-carbamylmaleamic acid, but they need not be mixed in that feed ratio. Excess maleic anhydride or urea can be present during the reaction, showing that the feed ratio is not critical.

The following examples illustrate my invention:

*Example 1*

A solution of 500 g. of maleic anhydride and 300 g. of urea in 1000 ml. of glacial acetic acid was heated at 50° C. for 12 hours, during which time N-carbamylmaleamic acid began to crystallize. The mixture was allowed to cool and was left overnight at room temperature. The white crystalline product was filtered and washed with glacial acetic acid, and dried at 50° C. The N-carbamylmaleamic acid, 405 g. or 51.3% of theory, melts at 161–162° C. with decomposition.

*Analysis.*—Calcd. for $C_5H_6N_2O_4$: nitrogen, 17.72%; neutral equivalent, 158.0. Found: nitrogen, 17.68%; neutral equivalent, 159.2.

The process of Example 1 is readily adaptable to large-scale commercial production. For example, when a mixture of 500 lbs. of maleic anhydride, 300 lbs. of urea and 1000 lbs. of glacial acetic acid was heated at 50° C. as in Example 1, except that the time of heating was somewhat increased, about the same percentage yield of N-carbamylmaleamic acid having the same purity was obtained.

The percentage yield thus obtained is much higher than that obtainable when the two reagents are fused together in the absence of a solvent. Further, when the two reagents are fused together at 100° C. according to the method of Dunlap and Phelps, Am. Chem. J. 19, 492–6 (1897), the reaction becomes uncontrollably violent unless the amount of the reagents is kept very small. For example, a mixture of only 50 g. of maleic anhydride and 30 g. of urea reacts so violently when heated on the steam bath that much of it flies out of the container almost explosively. On a still smaller scale the reaction can be controlled, but the best yield of N-carbamylmaleamic acid I have been able to obtain in that manner is about 20% of theory. When the reaction is carried out at 80° C., as recommended by Cavallito and Smith, J. Am. Chem. Soc. 63, 996 (1941), the reaction between 50 g. of maleic anhydride and 30 g. of urea can be controlled fairly well by vigorous cooling as soon as the two reagents have fused. However, even on so small a scale as this such control is not easy. It would be entirely impossible to carry out the prior art process, either at 80° C. or at 100° C., on a large scale because the heat evolved in the reaction could not be removed rapidly enough to keep the reaction from becoming explosively and dangerously violent. Furthermore, even on the very small scale at which the reaction can be carried out, the best obtainable yield of N-carbamylmaleamic acid is only about 40% of theory. This low yield is due to the very considerable formation of by-products which are difficult to separate from the desired product. When the reaction is carried out in the absence of a solvent the crude product mut be recrystallized several times from an appropriate solvent before it can be used in most subsequent reactions. I have observed that the formation of these by-products is accompanied by evolution of carbon dioxide and perhaps other gases from the reaction mixture. This evolution increases in amount with an increase in the temperature of the reaction. Even the slightest evolution of gas is an indication that the reaction is taking an undesirable course.

It is evident, therefore, that the use of a solvent during the reaction has improved the yield of N-carbamylmaleamic acid, has increased its purity so that it can be used without further purification, and has so moderated the reaction that it can be carried out on a commercially practical scale without any special precautions.

*Examples 2–4*

The mother liquor and part of the acetic acid wash from Example 1 was mixed with 500 g. of fresh maleic anhydride and 300 g. of fresh urea and heated at 50° C. for only five hours. The crystallized N-carbamylmaleamic acid, on cooling, was filtered out, washed and dried as in Example 1. A third batch was made in the same way as in Example 2, using the mother liquor and part of the wash from Example 2, and finally a fourth batch was made in the same way. The mother liquor remaining, after the fourth batch had been filtered, was left for 48 hours at room temperature, during which time additional N-carbamylmaleamic acid crystallized.

| Example | Solvent | | Yield | | Melting Point (° C.) |
|---|---|---|---|---|---|
| | Mother Liquor | Amount (g.) | Grams | Percentage | |
| 2 | #1 | 1,450 | 620 | 77.5 | (Dec.) 159–161 |
| 3 | #2 | 1,245 | 670 | 83.8 | 156–159 |
| 4 | #3 | 1,270 | 780 | 97.5 | 157–160 |
| From filtrate #4, after 48 hours at room terperature | | | 275 | | 159.5–161 |

Examples 2–4 show that the continued re-use of the mother liquor from previous batches accelerates the reaction and gradually improves the yield of N-carbamylmaleamic acid until it becomes substantially quantitative.

The total yield of product from Examples 1–4 was 2750 g., or 87% of theory, this being over twice the yield obtainable by the best prior art method known to me.

Example 5

When the reaction of Example 1 was repeated, except that the time of heating was only nine hours and the product was filtered immediately, the yield of N-carbamylmaleamic acid was only 29% of theory.

Contrast between this example and Examples 2–4, in which the reaction time at 50° C. was only five hours, shows even more strikingly the improvement effected by the use of the mother liquor instead of fresh acetic acid.

Example 6

A mixture of 100 parts of succinic anhydride, 60 parts of urea and 500 parts of acetic acid was warmed until the solution became homogeneous, and then was held at 80° C. overnight. During this time an almost solid mass of white crystals formed. The mixture was cooled to room temperature. The crystalline product was filtered, washed with acetic acid, and then dried in vacuo. The yield of N-carbamylsuccinamic acid (succinuric acid) was 87 parts, or 54% of theory. It melts at 218–220° C. after recrystallization from water. Dunlap, Am. Chem. J. 19, 336 (1897), reported the melting point as 211–211.5° C.[1]

*Analysis.*—Calcd. for $C_5H_8N_2O_4$: neutral equivalent 160. Found: neutral equivalent 161.

Example 7

A mixture of 112 parts of itaconic anhydride, 60 parts of urea and 300 parts of acetic acid was warmed somewhat in order to effect complete solution. The mixture was then heated overnight at 50–55° C. Nothing precipitated even on cooling the solution to room temperature. Most of the acetic acid was evaporated in vacuo. The white crystalline solid thus formed was filtered, washed with acetic acid, and dried in vacuo. The yield of N-carbamylitaconamic acid was 12 parts, or 7% of theory. It melts about 200° C., not sharply. It is believed to be a mixture of the two isomers, I and II, both of which are designated as N-carbamylitaconamic acid.

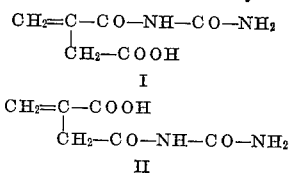

*Analysis.*—Calcd. for $C_6H_8N_2O_4$: nitrogen, 16.3%; neutral equivalent, 172. Found: nitrogen, 16.1%; neutral equivalent, 166.

Example 8

A mixture of 112 parts of citraconic anhydride and 60 parts of urea was dissolved in 110 parts of warm acetic acid. The solution was heated overnight at 50–55° C., and then was left for several days at room temperature. During this time a white solid crystallized. It was filtered, washed with ether, and dried. The yield of N-carbamylcitraconamic acid was 60 parts, or 35% of theory. After recrystallization from water it melted at 145–149° C. It is believed to be a mixture of the two isomers III and IV, both of which are designated at N-carbamylcitraconamic acid.

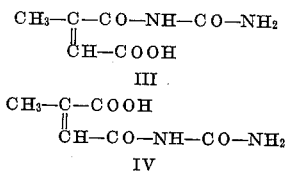

[1] Dunlap mistakenly says "succinic" acid two lines above his melting point, but he obviously means "succinuric" acid.

*Analysis.*—Calcd. for $C_6H_8N_2O_4$: nitrogen, 16.3%; neutral equivalent, 172. Found: nitrogen, 16.4%; neutral equivalent, 168.

Example 9

A mixture of 19.6 parts of maleic anhydride, 23.4 parts of N-n-butylurea and 50 parts of acetic acid was heated at 55° C. for 11 hours. The clear yellow solution was evaporated in vacuo to small volume. When the very viscous liquid residue was poured into ice water, a white solid was precipitated. It was recrystallized from water. The yield of N-(n-butylcarbamyl)-maleamic acid was 25 parts, or 58% of theory. It melted at 105.5–107° C.

*Analysis.*—Calcd. for $C_9H_{14}N_2O_4$: nitrogen, 13.05%; neutral equivalent, 214. Found: nitrogen, 13.02%; neutral equivalent, 213.8.

Example 10

A mixture of 13.6 parts of N-phenylurea, 19.6 parts of maleic anhydride and 50 parts of acetic acid was heated at 55° C. for 12 hours. The product crystallized from the cooled solution. It was filtered, washed with water and recrystallized from ethyl acetate. The yield of N-(phenylcarbamyl)-maleamic acid was 7.5 parts, of 32% of theory. It melted at 162–163° C.

*Analysis.*—Calcd. for $C_{11}H_{10}N_2O_4$: nitrogen, 11.95%; neutral equivalent, 234. Found: nitrogen, 11.81%; neutral equivalent, 231.7.

Example 11

A mixture of 39.8 parts of N-tert-butylurea, 58.8 parts of maleic anhydride and 200 parts of acetic acid was heated at 55° C. for 12 hours. Most of the acetic acid was evaporated in vacuo. The solid residue was washed with cold water, and then was recrystallized from water. The yield of N-(tert-butylcarbamyl)-maleamic acid was 42 parts, or 71% of theory. It melted at 151.5–153.5° C.

*Analysis.*—Calcd. for $C_9H_{14}N_2O_4$: nitrogen, 13.05%; neutral equivalent, 214. Found: nitrogen, 13.07%; neutral equivalent, 210.

Having thus described my invention, what I claim and desire to protect by Letters Patent is:

1. A method of preparing N-carbamylamic acids which comprises reacting an anhydride of an acyclic alpha, beta-dicarboxylic acid and a member of the group consisting of urea, and urea having one of its hydrogens replaced by hydrocarbon, in a mutual solvent for both reagents, at a temperature in the range from about 20° C. to about 80° C., said solvent being a saturated aliphatic acid having not in excess of four carbon atoms.

2. A method of preparing maleuric acid which comprises reacting maleic anhydride and urea in a mutual solvent for both reagents, at a temperature in the range from about 20° C. to about 80° C., said solvent being a saturated aliphatic acid having not in excess of four carbon atoms.

3. A method of preparing maleuric acid which comprises reacting maleic anhydride and urea in a mutual solvent for both reagents, at a temperature in the range from about 20° C. to about 80° C., said solvent being a saturated aliphatic acid having not in excess of four carbon atoms, the said reaction being carried out in the mother liquor resulting from a previous similar reaction whereby to increase the yield of maleuric acid.

4. A method of preparing N-carbamylamic acids which comprises reacting an anhydride of an acyclic alpha, beta-dicarboxylic acid and a member of the group consisting of urea, and urea having one of its hydrogens replaced by hydrocarbon, in a mutual solvent for both reagents, at a temperature in the range from about 20° C. to about 80° C., said solvent being a saturated aliphatic acid having not in excess of four carbon atoms, the said reaction being carried out in the mother liquor resulting from a previous similar reaction whereby to increase the yield of the N-carbamylamic acid.

5. A method of preparing succinuric acid which comprises reacting succinic anhydride and urea in a mutual solvent for both reagents, at a temperature in the range from about 20° C. to about 80° C., said solvent being a saturated aliphatic acid having not in excess of four carbon atoms.

6. A method of preparing N-(tert-butylcarbamyl)-maleamic acid which comprises reacting maleic anhydride and N-tert-butyl urea in a mutual solvent for both reagents, at a temperature in the range from about 20° C. to about 80° C., said solvent being a saturated aliphatic acid having not in excess of four carbon atoms.

7. A method of preparing N-(n-butylcarbamyl)-maleamic acid which comprises reacting maleic anhydride and N-n-butyl urea in a mutual solvent for both reagents, at a temperature in the range from about 20° C. to about 80° C., said solvent being a saturated aliphatic acid having not in excess of four carbon atoms.

No references cited.